(12) United States Patent
Lemus

(10) Patent No.: US 8,033,514 B2
(45) Date of Patent: Oct. 11, 2011

(54) MOTORCYCLE STAND

(76) Inventor: Edward M. Lemus, Divide, CO (US)

( * ) Notice: Subject to any disclaimer, the term of this patent is extended or adjusted under 35 U.S.C. 154(b) by 114 days.

(21) Appl. No.: 12/534,263

(22) Filed: Aug. 3, 2009

(65) Prior Publication Data

US 2011/0024602 A1 Feb. 3, 2011

(51) Int. Cl.
*F16M 11/38* (2006.01)
(52) U.S. Cl. ..... 248/166; 248/150; 248/151; 248/163.1; 248/165; 248/170; 248/439; 248/173; 248/440.1; 248/188.8; 248/188.6; 248/688; 248/649; 248/499; 248/500; 211/167
(58) Field of Classification Search .................. 248/150, 248/151, 163.1, 165, 166, 170, 439, 173, 248/440.1, 188.8, 188.6, 688, 649, 499, 500; 211/167, 5, 22, 23, 24
See application file for complete search history.

(56) References Cited

U.S. PATENT DOCUMENTS

| | | | | |
|---|---|---|---|---|
| 653,681 A * | 7/1900 | Lee | ............... | 280/296 |
| 729,291 A * | 5/1903 | Dickerson | .................. | 248/177.1 |
| 757,766 A * | 4/1904 | Palmer | ........................ | 248/177.1 |
| 873,121 A * | 12/1907 | Flory | ............... | 248/177.1 |
| 894,672 A * | 7/1908 | Leonard | ...................... | 248/188.6 |
| 3,063,667 A * | 11/1962 | Doty, Jr. et al. | ............... | 248/150 |
| 4,145,069 A * | 3/1979 | Kissick | ............. | 280/303 |
| 4,582,336 A * | 4/1986 | Onoda | .......................... | 280/293 |
| 5,358,265 A * | 10/1994 | Yaple | ............. | 280/293 |
| 5,388,848 A * | 2/1995 | Silva et al. | ..................... | 280/300 |
| 5,482,247 A * | 1/1996 | Smith | ......................... | 248/688 |
| 6,430,761 B1 * | 8/2002 | Brandorff et al. | ............... | 5/86.1 |
| 6,464,207 B2 * | 10/2002 | Creel et al. | .................... | 254/131 |
| 7,000,901 B1 * | 2/2006 | VanValkenburgh | .......... | 254/131 |
| 7,100,928 B1 | 9/2006 | VanValkenburgh | | |
| 7,188,854 B1 * | 3/2007 | Pickens | ......................... | 280/293 |
| 7,631,885 B2 * | 12/2009 | Safarik et al. | ................ | 280/293 |
| 7,677,510 B2 * | 3/2010 | Tang | .......................... | 248/188.5 |
| 7,740,219 B2 * | 6/2010 | Stengel et al. | ............... | 248/464 |
| 7,789,410 B1 * | 9/2010 | White | .......................... | 280/293 |
| 2002/0113230 A1 * | 8/2002 | Creel et al. | ..................... | 254/131 |
| 2003/0183734 A1 * | 10/2003 | Barnes et al. | .............. | 248/188.6 |
| 2007/0096070 A1 | 5/2007 | Kobacker, II et al. | | |
| 2007/0252119 A1 | 11/2007 | Kobacker, II et al. | | |
| 2008/0174088 A1 | 7/2008 | Kobacker, II et al. | | |

* cited by examiner

*Primary Examiner* — Nkeisha Smith
(74) *Attorney, Agent, or Firm* — Dale J. Ream

(57) ABSTRACT

A motorcycle stand includes first and second legs pivotable relative to one another between a maximum spread configuration, an intermediate spread configuration, and a storage configuration; the legs being generally parallel to one another when at the storage configuration. The motorcycle stand includes a biased plunger operatively coupled to the first leg and a pin operatively extending from at least one of the first and second legs. The second leg includes a first cavity configured to receive the plunger when the first and second legs are at the intermediate spread configuration. The first and second legs are maintained at the intermediate spread configuration when the plunger is received in the first cavity. The pin includes a distal segment for insertion in a motorcycle axle, the distal segment being neither parallel nor perpendicular to the first and second legs.

7 Claims, 6 Drawing Sheets

MOTORCYCLE STAND

BACKGROUND OF THE INVENTION

This invention relates generally to motorcycle stands and, more particularly, to a motorcycle stand for use in holding a motorcycle in a parked position upon uneven terrain.

Motocross type motorcycles are particularly adapted for riding in rugged off-road environments. Such motorcycles may be ridden for long periods of time in relatively remote areas where the land is not level and places to "park" the motorcycle when not being ridden are usually not available. In such circumstances, the motorcycle may have to be laid on its side or rested against a tree as motocross motorcycles typically do not have kickstands, either because it will not work well in the rugged terrain being ridden in or because it may be in the way while riding.

As an alternative, some motocross manufacturers provide a triangle shaped motorcycle stand that fits into a wheel hub to prop the motorcycle up when parked. Although assumably effective for its intended use, the triangle shaped motorcycle stand takes up an undesirable amount of space and is difficult to transport when not in use. In addition, such a stand is not effective when used on terrain that is not level.

Therefore, it would be desirable to have a motorcycle stand for propping up a motocross type motorcycle when it is parked and which is foldable for being carried easily when the motorcycle is being operated. Further, it would be desirable to have a motorcycle stand having two legs that are movable between selected spread positions and which is length adjustable for use on land that is not level.

SUMMARY OF THE INVENTION

A motorcycle stand according to a preferred embodiment of the present invention includes first and second legs pivotable relative to one another between a maximum spread configuration, an intermediate spread configuration, and a storage configuration; the legs being generally parallel to one another when at the storage configuration. The motorcycle stand includes a biased plunger operatively coupled to the first leg and a pin operatively extending from at least one of the first and second legs. The second leg includes a first cavity configured to receive the plunger when the first and second legs are at the intermediate spread configuration. The first and second legs are maintained at the intermediate spread configuration when the plunger is received in the first cavity. The pin includes a distal segment for insertion in a motorcycle axle, the distal segment being neither parallel nor perpendicular to the first and second legs.

Therefore, a general object of this invention is to provide a motorcycle stand for propping up a motocross type motorcycle when it is parked and which is foldable for being carried when the motorcycle is being operated.

Another object of this invention is to provide a motorcycle stand, as aforesaid, that is portable and not cumbersome to transport when not in use.

Still another object of this invention is to provide a motorcycle stand, as aforesaid, that may be moved easily between maximum spread, intermediate spread, and storage configurations.

A further object of this invention is to provide a motorcycle stand, as aforesaid, in which each leg is length adjustable such that the motorcycle stand may be used effectively on ground surfaces that are not level.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 5a is another front view of the motorcycle stand as in FIG. 1a;

FIG. 5b is a sectional view taken along line 5b-5b of FIG. 5a;

DESCRIPTION OF THE PREFERRED EMBODIMENT

A motorcycle stand 100 will now be described in detail with reference to FIG. 1a through FIG. 6d of the accompanying drawings. More particularly, a motorcycle stand 100 of one embodiment includes first and second legs 110, 120 and a pin 150. The first and second legs 110, 120 and the pin 150 may be constructed of steel, aluminum, composite, and/or any other appropriate materials and combinations.

Figure 1A:
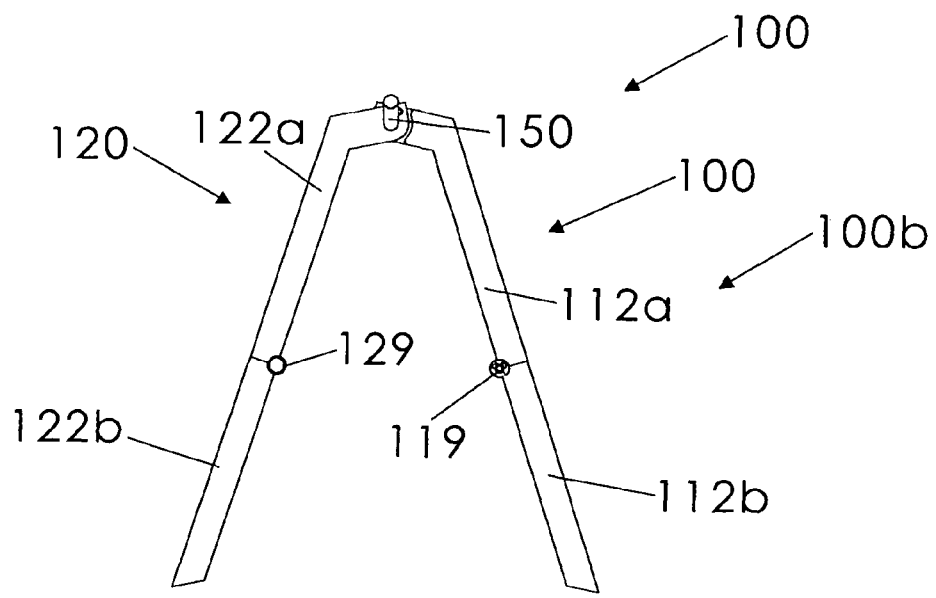
FIG. 1a is a front view of a motorcycle stand in an intermediate spread configuration.
Figure 1B:
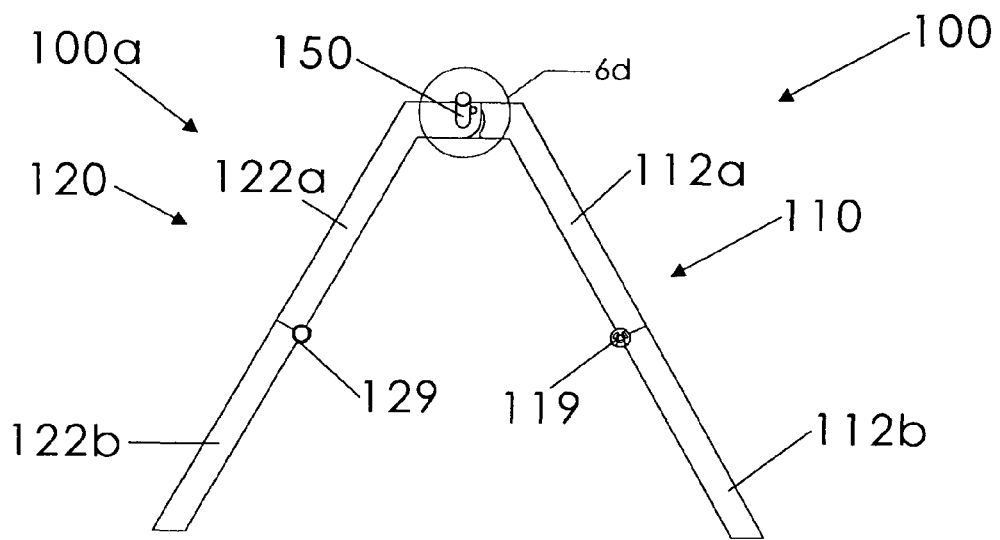
FIG. 1b is a front view of the motorcycle stand as in FIG. 1a in a maximum spread configuration.
Figure 4:
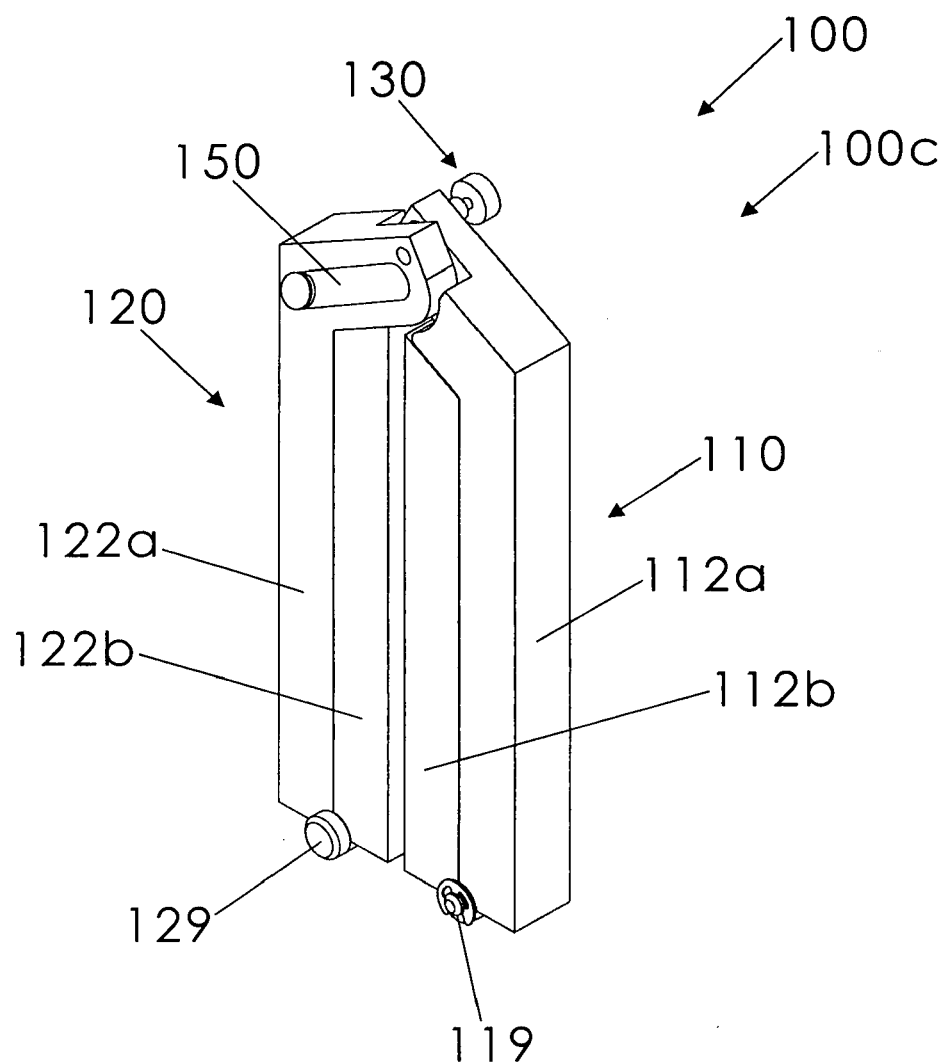
FIG. 4 is a perspective view of the motorcycle stand in a storage configuration.
Figures 5A, 5B:
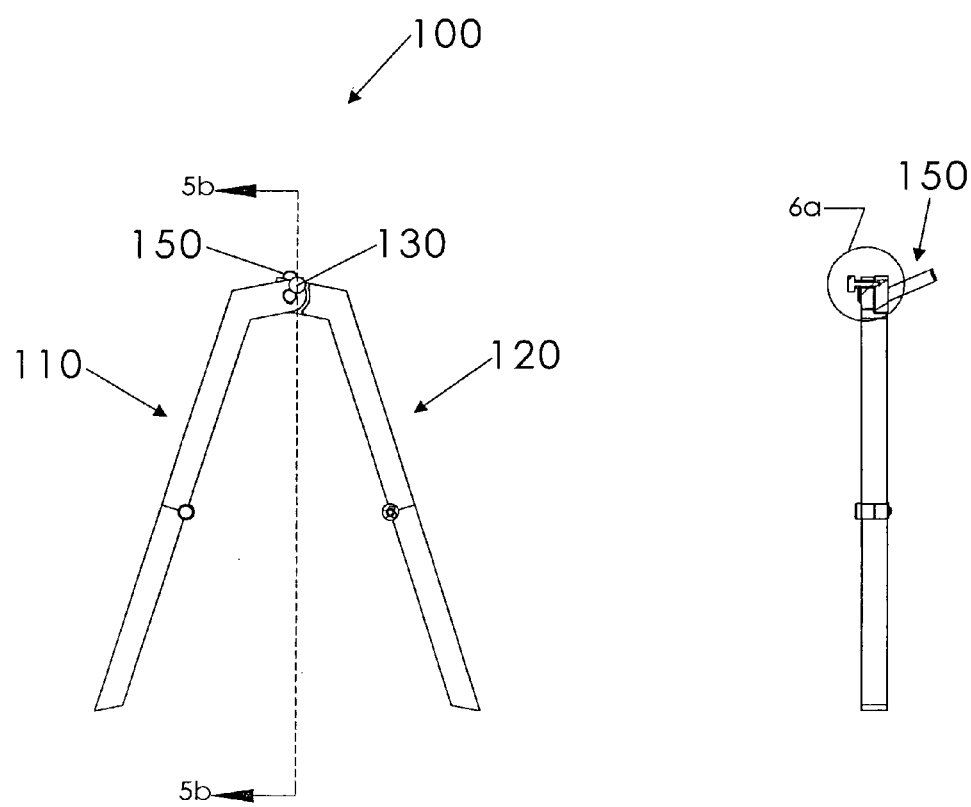

As shown in FIGS. 1a, 1b, and 4, the first and second legs 110, 120 are pivotable relative to one another between a maximum spread configuration 100a (FIG. 1b), an intermediate spread configuration 100b (FIG. 1a), and a storage configuration 100c (FIG. 4). The legs 110, 120 may be generally parallel to one another when at the storage configuration 100c, and the first and second legs 110, 120 may be coplanar. Interference between the first and second legs 110, 120 may prevent the first and second legs 110, 120 from pivoting beyond the maximum spread configuration 100a.

Figure 6A:
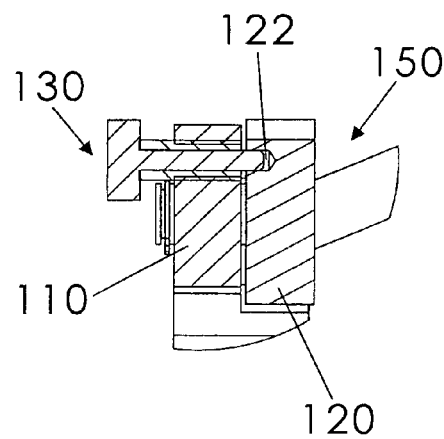
FIGS. 6a to 6c are isolated views on an enlarged scale taken from FIG. 5b with plunger 130 in a various positions relative to a cavity.
Figure 6B:
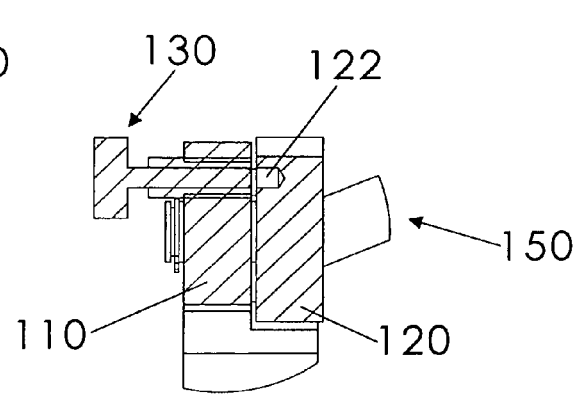
Figure 6C:
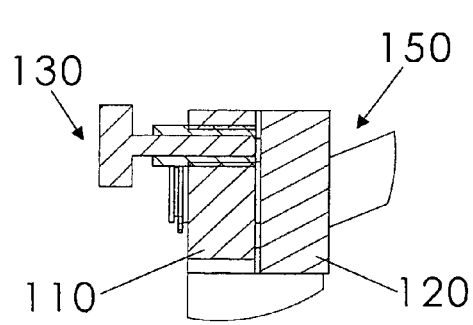
Figure 6D:
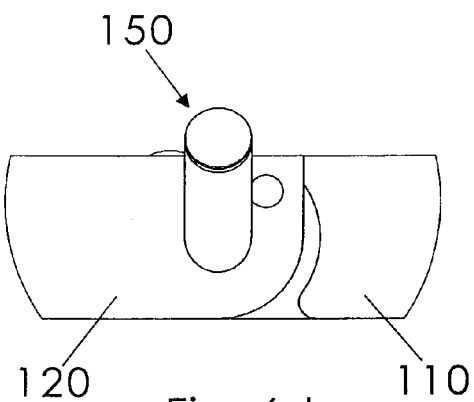
FIG. 6d is an isolated view on an enlarged scale taken from FIG. 1b.

A plunger 130 (e.g., a spring-biased pin, a pin, etc.) is operatively coupled to the first leg 110, and the second leg 120 has at least one cavity 122 for receiving the plunger 130 (FIG. 6a). In some embodiments, multiple cavities 122 may be included. For example, one cavity 122 may be configured to receive the plunger 130 when the first and second legs 110, 120 are at the maximum spread configuration 100a, another cavity 122 may be configured to receive the plunger 130 when the first and second legs 110, 120 are at the intermediate spread configuration 100b, and still another cavity 122 may be configured to receive the plunger 130 when the first and second legs 110, 120 are at the storage configuration 100c. When the plunger 130 is received in the various cavities 122, respectively, the legs 110, 120 may be maintained at the maximum spread configuration 100a, the intermediate spread configuration 100b, and the storage configuration 100c.

The first and second legs 110, 120 may be collapsible. For example, as shown in FIGS. 1a through 4, the first leg 110 may have two segments 112a, 112b (referred to herein as "upper segment 112a" and "lower segment 112b") pivotable relative to one another (e.g., about hinge 119) between an unfolded configuration (FIGS. 1a through 3) and a folded configuration (FIG. 4). The hinge 119 couples the upper and lower segments 112a, 112b together such that the lower segment 112b may rotate from the unfolded configuration (e.g., in line with the upper segment 112a) toward the second leg 120. Similarly, the second leg 120 may have two segments 122a, 122b (referred to herein as "upper segment 122a" and "lower segment 122b") pivotable relative to one another (e.g., about hinge 129) between an unfolded configuration (FIGS. 1a through 3) and a folded configuration (FIG. 4). The hinge 129 couples the upper and lower segments 122a, 122b together such that the lower segment 122b may rotate from the unfolded configuration (e.g., in line with the upper segment 122a) toward the first leg 110.

Figure 2:
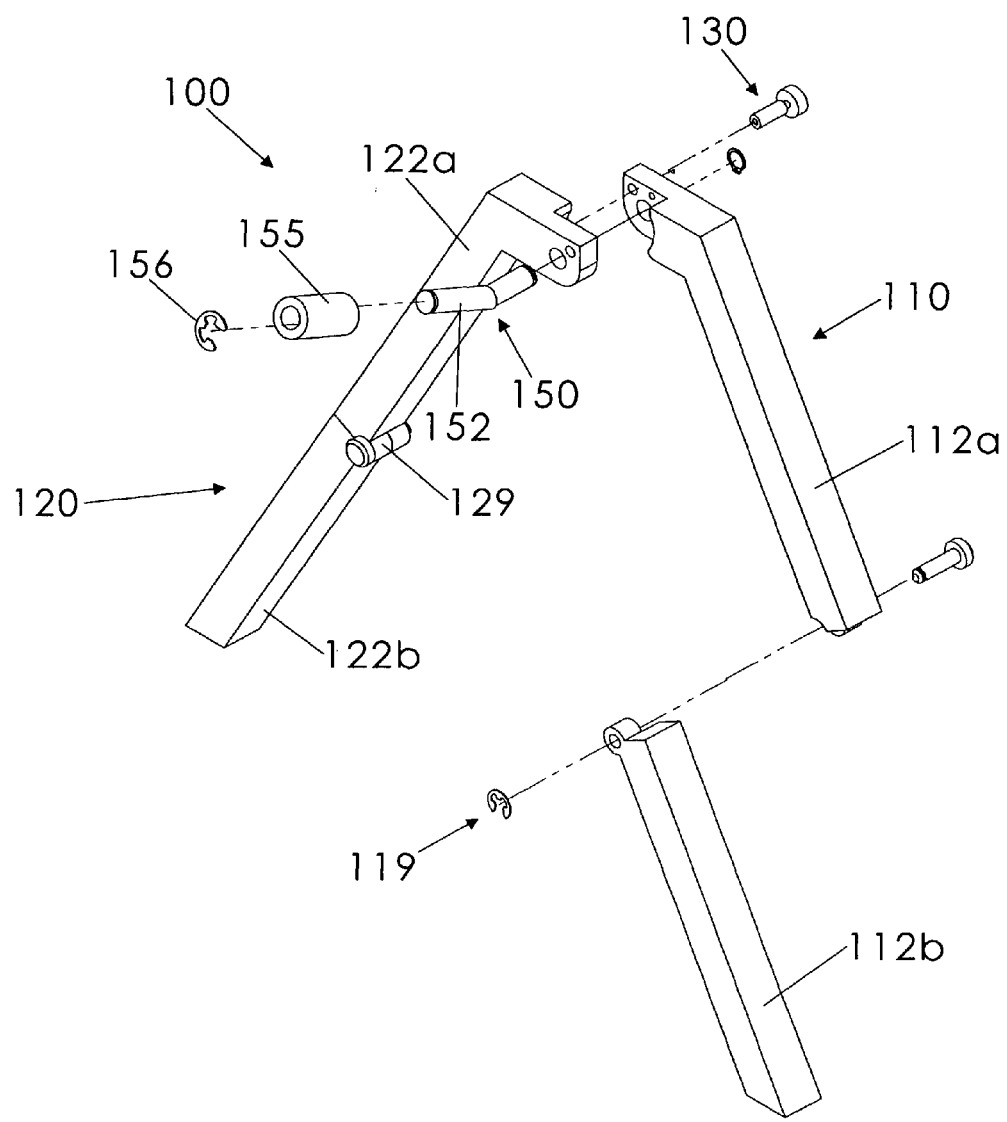
FIG. 2 is an exploded view as in FIG. 1b.
Figure 3:
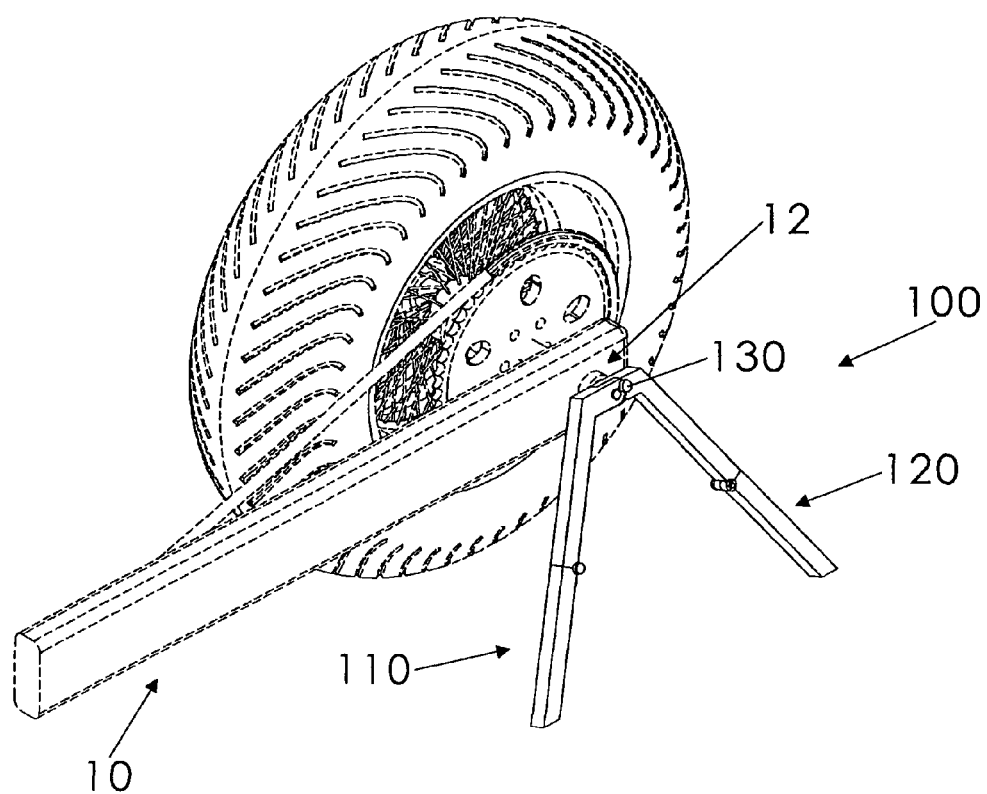
FIG. 3 is a perspective view of the motorcycle stand in use with a motorcycle wheel.

The pin 150 operatively extends from at least one of the first and second legs 110, 120, as shown throughout the drawings. As best shown in FIG. 2, the pin 150 has a distal segment 152 for insertion in an axle 12 of a motorcycle 10 (FIG. 3). The distal segment 152 is neither parallel nor perpendicular to the first and second legs 110, 120. Means for increasing a diameter of the pin distal segment 152, such as the bushing 155 and snap ring 156 (FIG. 2) may also be included.

In use, the legs 110, 120 may initially be at the storage configuration 100c (FIG. 4). Interaction between the plunger 130 and the cavity 122 configured to receive the plunger 130 when the legs 110, 120 are at the storage configuration 100c may maintain the legs 110, 120 at the storage configuration 100c, as discussed above. By releasing the plunger 130 from the cavity 122, the legs 110, 120 may be moved from the storage configuration 100c to the maximum spread configuration 100a (FIG. 1b) or the intermediate spread configuration 100b (FIG. 1a), and the legs 110, 120 may be maintained at those configurations as discussed above. The user may select between the maximum spread configuration 100a and the intermediate spread configuration 100b based on terrain (e.g., flat, sloped, etc.), for example. Using the maximum spread configuration 100a in effect causes the stand 100 to be taller than when the intermediate spread configuration 100b is used. The pin 150 (e.g., the distal segment 152) may be inserted in the motorcycle axle 12 (FIG. 3) and the weight of the motorcycle 10 may be supported by the legs 110, 120 to keep the motorcycle 10 upright.

If the legs 110, 120 are collapsible, the leg segments 112a, 112b, 122a, 122b may be maintained at the unfolded configuration (FIGS. 1a through 3) when the legs 110, 120 are at the maximum spread configuration 100a or the intermediate spread configuration 100b, and may be maintained at the folded configuration (FIG. 4) when the legs 110, 120 are at the storage configuration 100c. The stand 100 may be easily transported when the leg segments 112a, 112b are at the folded configuration and the legs 110, 120 are at the storage configuration 100c due to its compact arrangement.

It is understood that while certain forms of this invention have been illustrated and described, it is not limited thereto except insofar as such limitations are included in the following claims and allowable functional equivalents thereof.

The invention claimed is:

1. A motorcycle stand, comprising:
first and second legs pivotable relative to one another between a maximum spread configuration, an intermediate spread configuration, and a storage configuration; said legs being generally parallel to one another when at said storage configuration;
a biased plunger operatively coupled to said first leg; and
a pin operatively extending from at least one of said first and second legs;
wherein said second leg has a first cavity configured to receive said plunger when said first and second legs are at said intermediate spread configuration, said first and second legs being maintained at said intermediate spread configuration when said plunger is received in said first cavity;
wherein said pin has a distal segment for insertion in a motorcycle axle, the distal segment being neither parallel nor perpendicular to said first and second legs;
wherein said first leg has upper and lower segments pivotable relative to one another between folded and unfolded configurations to allow said first leg lower segment to rotate from in line with said first leg upper segment toward said second leg; and
wherein said second leg has upper and lower segments pivotable relative to one another between folded and unfolded configurations to allow said second leg lower segment to rotate from in line with said second leg upper segment toward said first leg.

2. The stand of claim 1, wherein said first and second legs are coplanar.

3. The stand of claim 1, wherein:
said first leg is selectively collapsible; and
said second leg is selectively collapsible.

4. The stand of claim 3, further comprising means for increasing a diameter of said pin distal segment.

5. The stand of claim 1, further comprising:
a hinge coupling said upper and lower segments of said first leg together and allowing said first leg lower segment to rotate toward said second leg; and
another hinge coupling said upper and lower segments of said second leg together and allowing said second leg lower segment to rotate toward said first leg.

6. A motorcycle stand, comprising:
first and second legs pivotable relative to one another between a maximum spread configuration, an intermediate spread configuration, and a storage configuration;
a plunger operatively coupled to said first leg; and
a pin operatively extending from at least one of said first and second legs;
wherein said second leg has a first cavity configured to receive said plunger when said first and second legs are at said intermediate spread configuration, said first and second legs being maintained at said intermediate spread configuration when said plunger is received in said first cavity;
wherein said pin has a distal segment for insertion in a motorcycle axle, the distal segment being neither parallel nor perpendicular to said first and second legs;
wherein said first leg has upper and lower segments that are pivotal relative to one another and a hinge coupling said upper and lower segments of said first leg together to allow said first leg lower segment to rotate from in line with said first leg upper segment toward said second leg; and
wherein said second leg has upper and lower segments that are pivotal relative to one another and a hinge coupling said upper and lower segments of said second leg together to allow said second leg lower segment to rotate from in line with said second leg upper segment toward said first leg.

7. The stand of claim 6, wherein:
said first leg is collapsible; and
said second leg is collapsible.

* * * * *